(12) United States Patent
Watry et al.

(10) Patent No.: US 9,406,240 B2
(45) Date of Patent: Aug. 2, 2016

(54) INTERACTIVE EDUCATIONAL SYSTEM

(71) Applicant: Dynepic, LLC, Folly Beach, SC (US)

(72) Inventors: Krissa Watry, Folly Beach, SC (US);
Jacqueline Arn, Beavercreek, OR (US);
Andrew J. Pappas, Charleston, SC (US)

(73) Assignee: Dynepic Inc., Charleston, SC (US)

( * ) Notice: Subject to any disclaimer, the term of this patent is extended or adjusted under 35 U.S.C. 154(b) by 0 days.

(21) Appl. No.: 14/052,120

(22) Filed: Oct. 11, 2013

(65) Prior Publication Data
US 2015/0104774 A1   Apr. 16, 2015

(51) Int. Cl.
*G09B 23/00* (2006.01)
*G09B 5/06* (2006.01)
*G09B 5/00* (2006.01)
*G09B 23/06* (2006.01)

(52) U.S. Cl.
CPC .. *G09B 5/06* (2013.01); *G09B 5/00* (2013.01); *G09B 23/00* (2013.01); *G09B 23/06* (2013.01)

(58) Field of Classification Search
CPC ............ G09B 5/00; G09B 23/00; A63H 3/00; A63H 3/16; A63H 3/46
USPC .......................................... 434/276, 382, 300
See application file for complete search history.

(56) References Cited

U.S. PATENT DOCUMENTS

| | | | |
|---|---|---|---|
| 6,082,139 A * | 7/2000 | Davidziak | 63/23 |
| 6,159,101 A * | 12/2000 | Simpson | 463/46 |
| 6,213,781 B1 * | 4/2001 | Kimball | 434/300 |
| 6,253,058 B1 | 6/2001 | Murasaki et al. | |
| 6,443,736 B1 * | 9/2002 | Lally | G09B 23/10 434/300 |
| 6,561,810 B1 * | 5/2003 | Schellhardt | G09B 23/12 434/126 |
| 6,843,703 B1 * | 1/2005 | Iaconis et al. | 446/371 |
| 6,959,166 B1 * | 10/2005 | Gabai et al. | 434/308 |
| 7,081,033 B1 | 7/2006 | Mawle et al. | |
| 7,712,365 B1 | 5/2010 | James | |
| 8,033,901 B2 | 10/2011 | Wood | |
| 8,246,356 B2 * | 8/2012 | Vanderelli | G01R 33/10 434/276 |
| 8,425,273 B2 * | 4/2013 | Atsmon et al. | 446/175 |

(Continued)

FOREIGN PATENT DOCUMENTS

| | | |
|---|---|---|
| EP | 1889234 A1 | 2/2008 |
| JP | 2008149442 | 7/2008 |

(Continued)

OTHER PUBLICATIONS

PCT Search Report and Written Opinion, Jan. 14, 2015.

*Primary Examiner* — Peter Egloff
(74) *Attorney, Agent, or Firm* — Gregory Finch, Esq.; Ernest Lipscomb, Esq.

(57) ABSTRACT

An interactive educational system for elementary school age children is provided. There is a base module having a housing that has an outer configuration and may take a variety of shapes. The housing includes retaining sockets used to retain arms, legs, or other accessories or to the system. The base module includes a transceiver, a group of one or more sensors and effectors, control circuitry that operates the system, and a power supply which powers the module. Data from the sensors and effectors is displayed on the video display and passed wireless to a smart device hosting an interactive application. The base module has a wireless transceiver for receiving control data from the smart device and sending sensor/effector data and base module state information to the smart device. The sensor group includes various sensors such as a temperature sensor, a light sensor and an accelerometer.

18 Claims, 7 Drawing Sheets

(56) References Cited

U.S. PATENT DOCUMENTS

| | | | |
|---|---|---|---|
| 2006/0234602 A1* | 10/2006 | Palmquist | 446/297 |
| 2007/0072161 A1* | 3/2007 | Bugrov | G09B 23/18 434/300 |
| 2010/0167623 A1 | 7/2010 | Eyzaguirre et al. | |
| 2011/0021108 A1* | 1/2011 | Le et al. | 446/298 |
| 2011/0250819 A1* | 10/2011 | Tashman | 446/46 |
| 2013/0109267 A1* | 5/2013 | Schweikardt et al. | 446/85 |

FOREIGN PATENT DOCUMENTS

| | | |
|---|---|---|
| KR | 100549800 | 2/2006 |
| KR | 200438227 | 2/2008 |
| KR | 100898987 | 5/2009 |
| KR | 200447772 | 2/2010 |

* cited by examiner

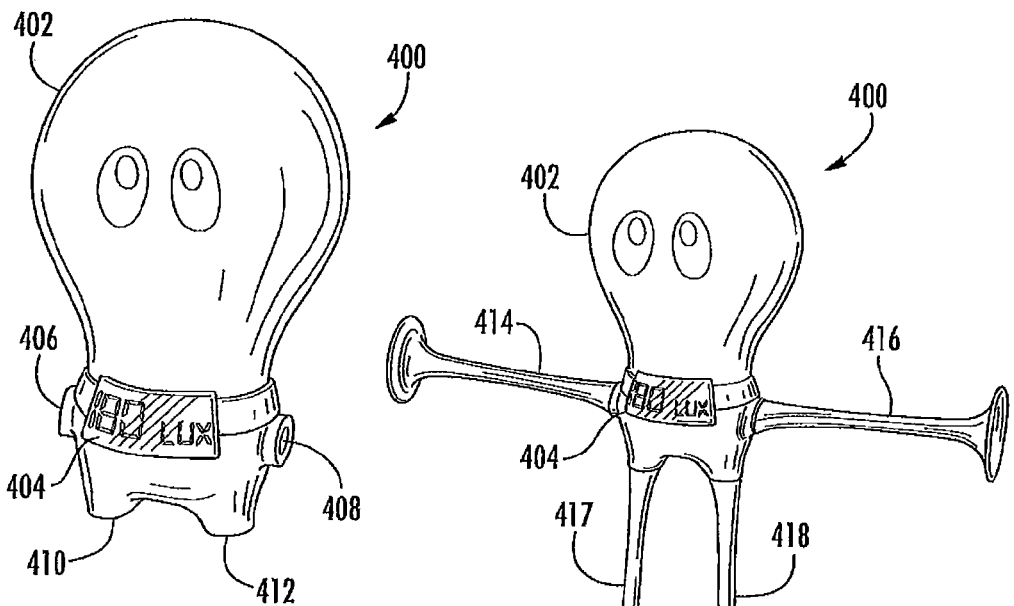
FIG. 7A
FIG. 7B
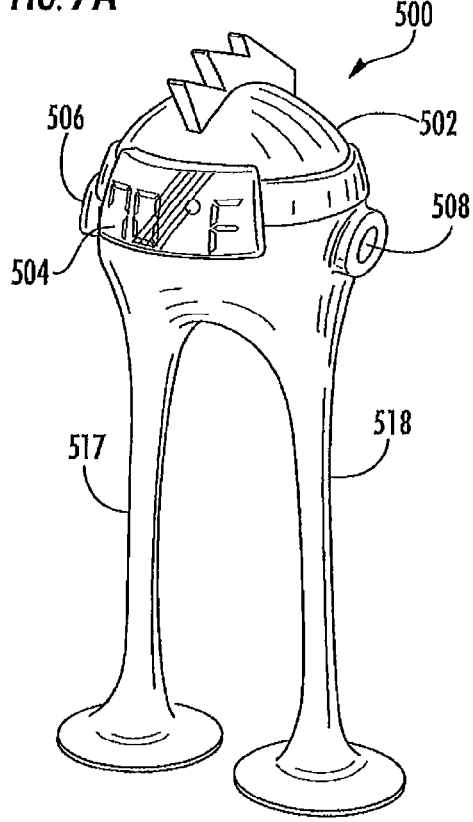
FIG. 8

INTERACTIVE EDUCATIONAL SYSTEM

BACKGROUND OF THE INVENTION

1. Field of the Invention

The present invention relates to an interactive educational system for elementary school age children. More particularly, the present invention is an interactive learning tool for collecting and displaying scientific data and presenting that data to children age 5 and over in such manner to encourage the child to learn more about the scientific principle involved.

2. Description of Related Art

Current educational teaching systems and youth science experiment kits require adult help to set up the experimental activity and expect the children to be, at a minimum, technology savvy. While there are systems available for collecting data and transmitting the data to another location and there are gaming systems available that provide entertainment for children, there has been little effort made to utilize technology to teach elementary school age children.

Educational learning toys enhance intellectual, social, and/or physical development and are designed to encourage reasonable development milestones within appropriate age groups. There is little doubt that education tools and toys play a constructive role in the modern education curriculum. Interactive electronic toys such as robots and the like are frequently used as part of the curriculum in high school and post-secondary education. Existing electronic learning toys for elementary aged kids are designed to aid a child's educational growth in such areas as spelling, vocabulary, mathematics and language. These interactive learning toys include electronic laptops, video games and other educational tools.

It is also known that children respond to tools that allow them to design and build things, and increase participation or demonstration in hands-on learning related to science, technology, engineering, mathematics and entrepreneurship.

However, there remains a need for interactive educational tools for use in the science and technology areas that are directed to children aged 5 and over. It has been stated that a child's engagement in scientific inquiry gives them the opportunity to receive accurate feedback directly from the outcomes of their own inquiry. The system of the present invention aids in providing that learning opportunity.

SUMMARY OF THE INVENTION

It is therefore the general object of the present invention to provide an easy to use learning tool for teaching elementary school age children scientific principles relating to phenomena, such as temperature, sound, light, gravity and the like.

The interactive educational system of the present invention has a base module that houses a complement of sensors and end effectors and an interactive application hosted on a smart device such as devices like a tablet, cell phone, or laptop. The base module has a housing with an outer configuration that is appealing to children. The housing contains the electronic circuitry that gathers data from the sensors and effectors within the housing and provides the information in a display on the base module. The base module transmits state information and sensor data wirelessly to a smart device. Multiple base units can communicate with the smart device and allow the smart device to collaboratively control and display multiple base units' data.

The housing of the base module may include retaining sockets used to retain accessories. The sockets preferably contain magnets in the bottom of each socket to attract and retain the arms and/or legs. The housing may be made of plastic, metal, or similar material and over-molded with a silicone-like material on the common body to seal the circuitry inside the housing. Over-molding provides a soft, durable body, and allows for custom colors and features for each modular design. The over-molded features can be changed for each base module design contemplated. The configuration of the housing of the base module may take a variety of shapes and sizes to form characters that are appealing to children.

The control circuitry includes a power supply and a voltage regulator which powers a controller. The controller is preferably an integrated circuit containing a processor core, memory, and programmable input/output peripherals. Data from the sensors and end effectors are sent to the controller where they can be transmitted to a smart device and presented on a base module's video display.

The base module has a wireless transceiver. The transceiver can receive data from a smart device to change the base module's mode of operation and articulate an end effector. The base module wirelessly sends sensor data, effector data, and base module state information to the smart device where the smart device can complete further processing on the data, store the data, or transmit it to the internet cloud. Different complements of sensors are included in the base modules such as a temperature sensor, a light sensor, sound pressure sensor, and an accelerometer to name a few. The base modules include a complement of end effectors. Some examples of end effectors include lights, buzzers, linear actuators, and rotary actuators to name a few. Examples of light and audio feedback responses include flashing LEDs and playing the different tones and tunes with the buzzer.

The smart device includes a common transceiver to talk wirelessly with the base modules. It is conceived that the smart device can come in many forms; for example, the smart device may be a fun toy form factor like the base modules, a dongle that plugs into a computer, a smart phone, a tablet, or any variation thereof. The smart device includes an application that allows the user to easily pair one or more base modules with the smart device, display state data and sensor data of the base module's connected to it, control the mode and state information of the base modules, and allow for collaborative programming of the base modules. For example, if a base module's sensor exceeds a preset limit set in the smart device's application, it may cause one or more of the base modules to make a mode change, play a tune, or light up. It is also conceived that the smart device transmitting the base module network information through the internet can allow kids to collaboratively control base modules linked to other smart devices.

Other objects, features, and advantages of the invention will be apparent to those skilled in the art from the following detailed description taken in conjunction with the drawings.

BRIEF DESCRIPTION OF THE DRAWINGS

Having described the invention in general terms, reference will now be made to the accompanying drawings, which are not necessarily drawn to scale, and wherein:

FIG. 7A illustrates a further embodiment of the base module of the interactive educational system of the present invention;

FIG. 7B illustrates the base module of FIG. 7A of the interactive educational system of the present invention having both removable arms and removable legs;

FIG. 8 illustrates the embodiment of FIG. 1 of the base module of the interactive educational system of the present invention having legs molded as one piece;

DESCRIPTION OF THE PREFERRED EMBODIMENT(S)

The present invention now will be described more fully hereinafter with reference to the accompanying drawings, in which preferred embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art. Like numbers refer to the elements throughout.

The interactive educational system of the present invention is a learning tool for elementary school age children. Rule-based controls allow the interactive educational system to provide a network to work together to become, for example, an alarm clock that beeps the base module of the interactive educational system that is placed, for example, in a child's room when another base module of interactive educational system with a motion sensor present has been placed on a dog's collar is reading movement. In addition, other base modules may include a light sensor that can be set to alert its base module or multiple base modules when the light intensity has reached a predetermined level. Another example of interactive educational system is that the system can become a sibling intrusion alert that makes all the base module components play a sound and light up when the base module with a motion sensor senses movement in the child's room. A smart device hosts an interactive application for configuring and reporting the sensors and effectors of the base modules. Programs and settings for the base modules, once set within the application, are transmitted wirelessly to the base modules. Base module sensors and end effectors data is transmitted along with base module state information to the interactive application. The base module comes in a fully assembled operational state for simple use.

Figure 1:
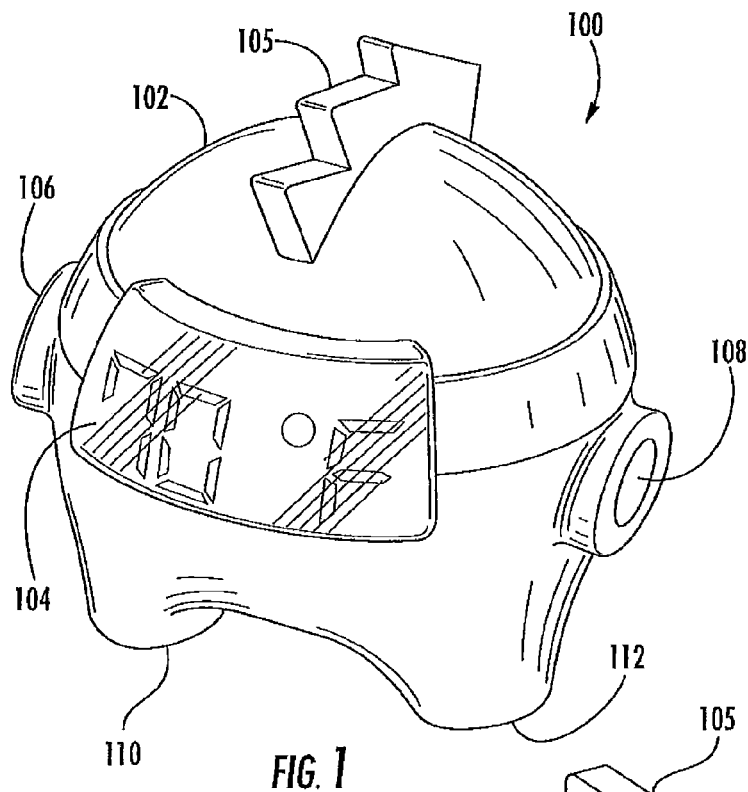
FIG. 1 is a front perspective view of the base module of one embodiment of the interactive educational system of the present invention.

The interactive educational system of the present invention is a smart collaborative sensor system and science experimental pal for children aged 5 and over. The interactive educational system includes a smart device with an interactive application and one or more base modules. The base modules house single or multiple sensors (e.g., acceleration, temperature, sound and the like) and one or more end effectors (e.g., lights, buzzer, lift mechanism, rotational turn mechanism, and the like). The base modules can wirelessly communicate with a smart device and to other base modules. One example of the base module 100 is shown in FIG. 1 in which the base module has a housing 102 with an outer configuration in the shape of a character that is appealing to children. The housing 102 contains the electronic control circuitry 120, shown more clearly in FIG. 4 that gathers data from the internal sensors, said data being associated with a scientific principle for teaching said principle to said children. The data gathered can be presented to the user as shown in display 104 in FIG. 1 on the front of the character housing the base module 100. The data is also transmitted wirelessly to the receiving smart device 800 where it is displayed in the interactive application 700, which is shown more clearly in FIG. 10.

Figure 2:
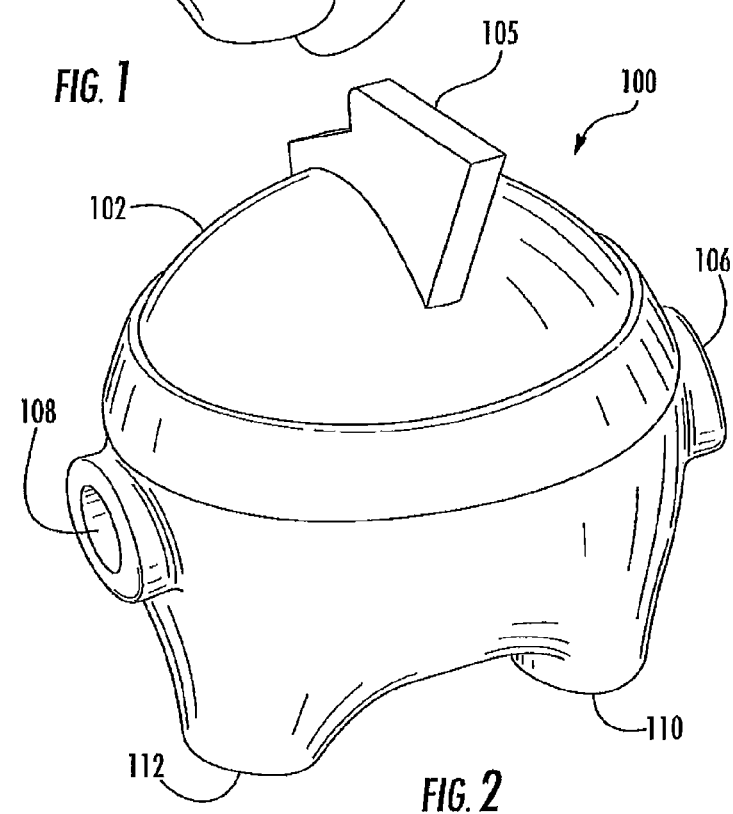
FIG. 2 is a rear perspective view of the base module of one embodiment of the interactive educational system of the present invention.
Figure 3:
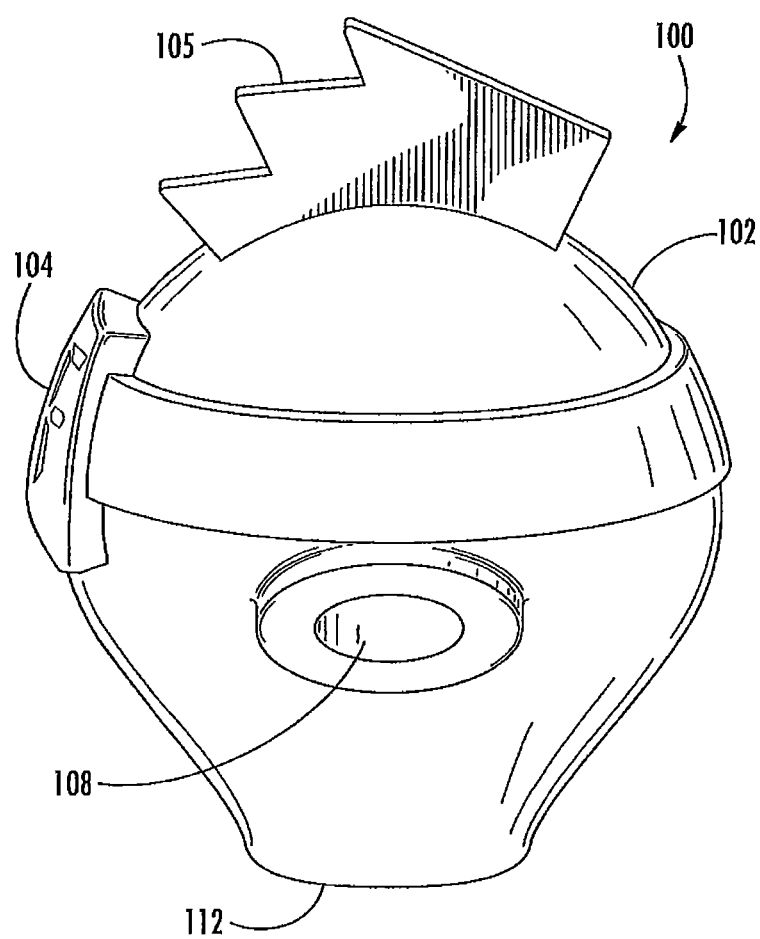
FIG. 3 is a right perspective view of the base module of an embodiment of the interactive educational system of the present invention.
Figure 5A:
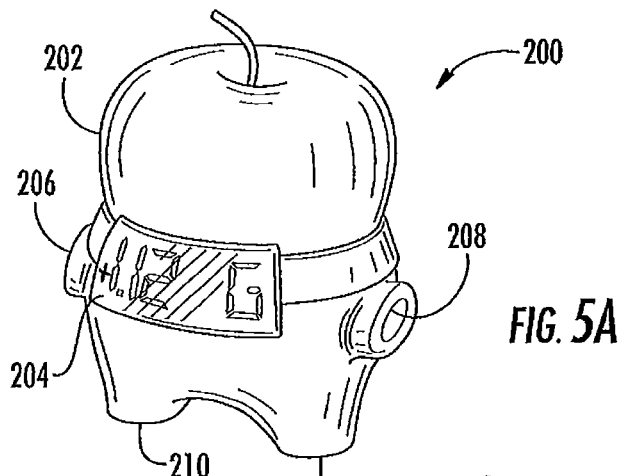
FIG. 5A illustrates another embodiment of the base module of the interactive educational system of the present invention.
Figure 5B:
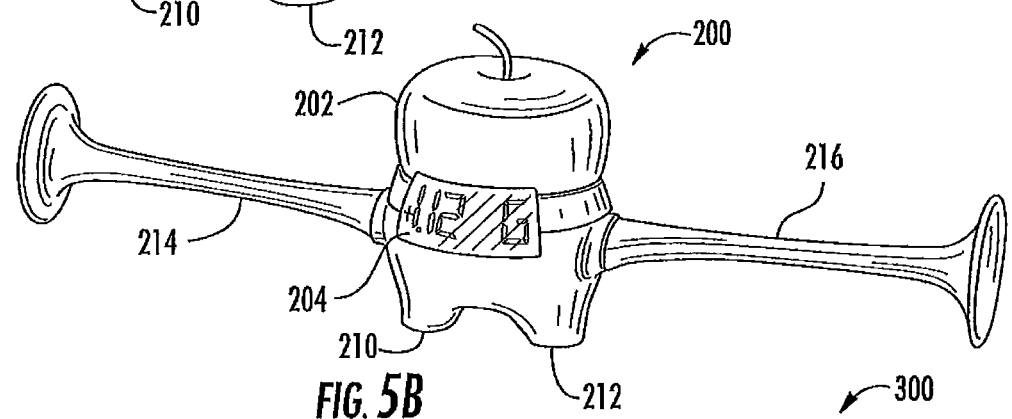
FIG. 5B illustrates the base module of the interactive educational system of the present invention shown in FIG. 5A having removable arms.

In the embodiment shown in FIGS. 1-3, the housing 102 of base module 100 includes retaining sockets 106, 108. The sockets 106, 108 may be seen more clearly in FIG. 3 and which may be used to retain arms, such as the flexible arms shown in FIG. 5B. In addition, housing 102 may have retaining sockets 110 and 112 which may be used to retain legs for the base module in place, such as shown in FIG. 6B. The sockets preferably contain magnets in the bottom of each socket to attract and retain magnets attached to the arms and/or legs of the character. While the sockets are shown protruding from the housing, the sockets may be conformal, below the outer surface, or in other orientations.

The housing 102 may be made of plastic, silicon, or similar material and over-molded by a silicon-like material on the common body to seal it (e.g., make it waterproof). Overmolding provides a soft, durable body, and allows for custom colors and features for each modular design. The overmolded features can be changed for each modular design contemplated. As shown in FIGS. 1-3, the base module 100 has decorative feature such as molded hair 105. In the base module 100 shown in FIG. 1 the digital display is reading 70° F. which indicates the temperature emanating from the base modules present surroundings.

Figure 4:
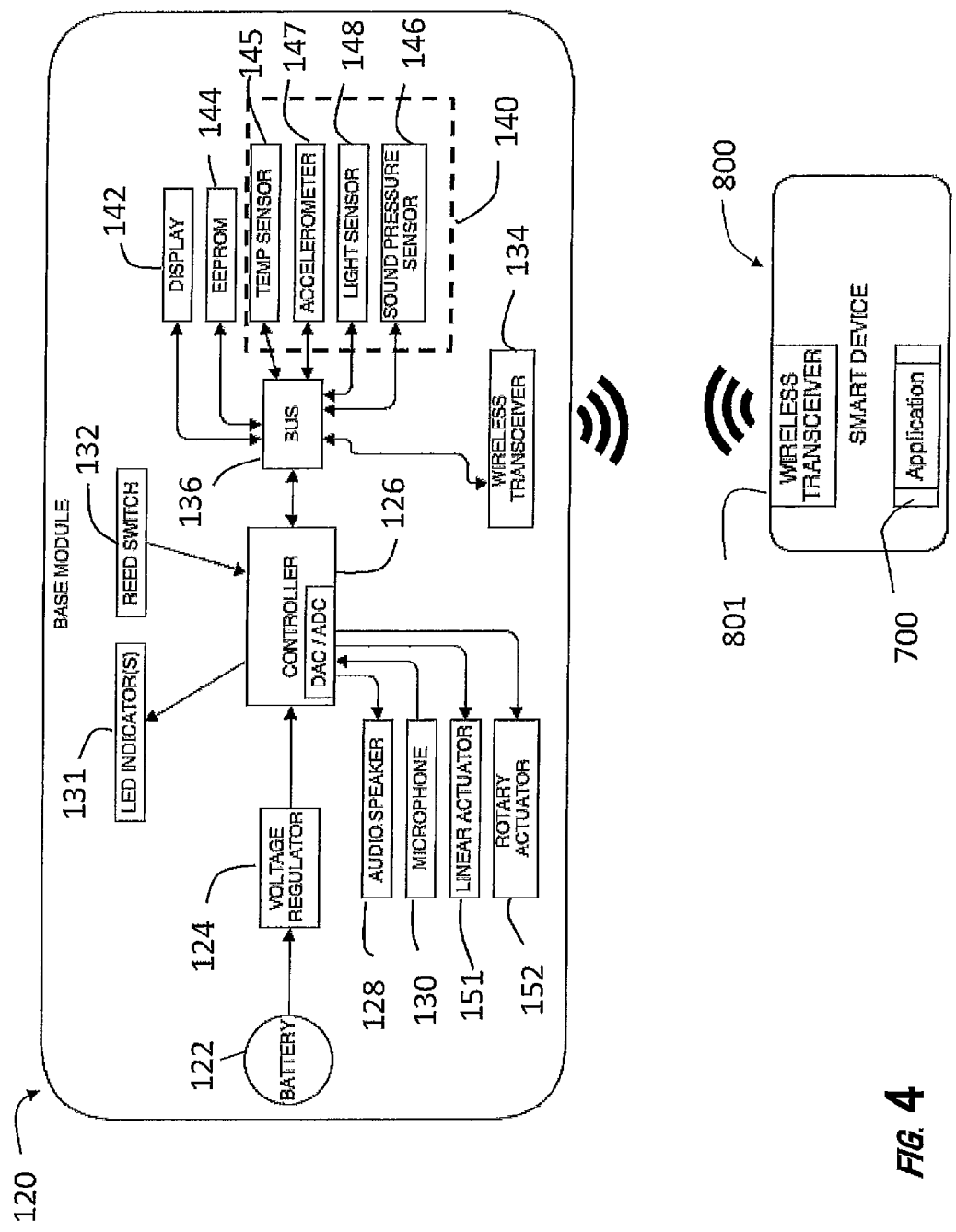
FIG. 4 is a block diagram of the control circuitry of the interactive educational system of the present invention.

The control circuitry 120 of the interactive educational system of the present invention is shown in FIG. 4. The control circuitry 120 includes a power supply. In the example shown in FIG. 4 the power supply comprises a 3V coin cell battery 122 and a DC/DC power controller/conditioner 124 that regulates the voltage to a controller 126.

The controller 126 is preferably an integrated circuit containing a processor core, memory, and programmable input/output peripherals operatively connected to a wireless transceiver 134. Preferably, the MCU will be an 8-bit AVR microcontroller, such as those supplied by Atmel®.

Data from the base module's 100 sensor group 140 is displayed on the video display 104 from information passed to the controller 126. The video display is preferably a reflective LCD, graphic on some models and alphanumeric on others. In the case of graphics, they would be built into the controller. Alphanumeric displays require an I/O expander or similar. Other graphic displays, such as, flexible electronic ink displays or other low power consumption screens could alternatively be used. LEDs 131 mounted in or reflected through the housing 102 provide feedback to user. The base module 100 sensor data may also be stored in the controller 126 or EEPROM 144 with time data for later download, graphing and analysis. The data is wirelessly communicated to the internet or an interactive application 700 of a PC or mobile device, also known as a smart device 800.

Alternatively, or in conjunction with the visual display 104 and the LED lights 131, audio responses may be provided. For example, the audio 128 may be a speaker capable of playing different tones and tunes. A microphone 130 and other sensor group 140 components will be selectively populated, depending on the particular base module. A reed switch 132 is connected to the controller 126 that allows the user to interact with the base module 100 of the educational system by opening and closing the switch with a magnetic field. It is conceived that some base modules 100 may contain additional mechanical effectors 151, 152 (e.g., rotary actuators, linear actuators, and other such devices) that respond when conditions are met or commands are sent wirelessly from the smart device to the specific base module.

The base module 100 has a wireless transceiver 134 for sending sensor/effector data and state information to the smart device and receiving commands and programs from the smart device. Preferably, the wireless transceiver 134 is housed in the base module 100 and connected through a bus 136 where the data is sent to or received from the controller 126.

The sensor group 140 are a selectively populated group of sensors used to gather and monitor scientific data and send the scientific data to controller 126 through the bus 136 in the circuitry of base module 120. The sensor group 140 may have only one sensor, e.g., a temperature sensor 145 but will preferably have several sensors such as light sensor 148, and accelerometer 147. Other sensors optionally include; sound, motion, rate, GPS, magnetic field, moisture, distance, color, humidity, barometric pressure, force, proximity, radiation, current, biometrics, camera, voltage, displacement, and capacitive touch. These sensors will likely be digital sensors capable of communicating via I2C or SPI but some may be analog and routed through an analog-to-digital converter. The data from the sensor may be stored in EEPROM 144 and sent to the wireless transceiver 134 or displayed on the sensor in display 142. The wireless transceiver 134 is preferably a Bluetooth low energy module. In operation, the child may, in this example, place a base module 100 populated with the temperature sensor 145 in a refrigerator and the sensor will gather data on the temperature inside the refrigerator and send that data to another base module 100 and the smart device 800 with the interactive application 700 for display.

The configuration of the base module 100 may take many shapes and forms such as, for example, those shown in FIGS. 5-8. As noted, the interactive educational system of the present invention is directed to children aged 5 and over and thus it is desirable to keep the child engaged and interested in using the system. As shown in FIG. 5A there is an embodiment of a base module 200 having a housing 202 in the shape of a character whose top portion is shaped like an apple. This embodiment, like that of FIG. 1, has sockets 206, 208 for receiving and maintaining arms and sockets 210, 212 for receiving and maintaining in place a pair of legs. As shown in FIG. 5B, the housing of base module of FIG. 5A has a pair of arms 214, 216 that are maintained by magnets in sockets 206, 208. These arms may have hands or suction cups at their ends and may contain magnets for attaching them together and to other objects. Information from a gravity sensor is displayed in display 204. The base module may use the same circuitry as that shown in FIG. 4. Of course, this embodiment may be designed to obtain data from other sources, such as light or temperature.

Figure 6A:
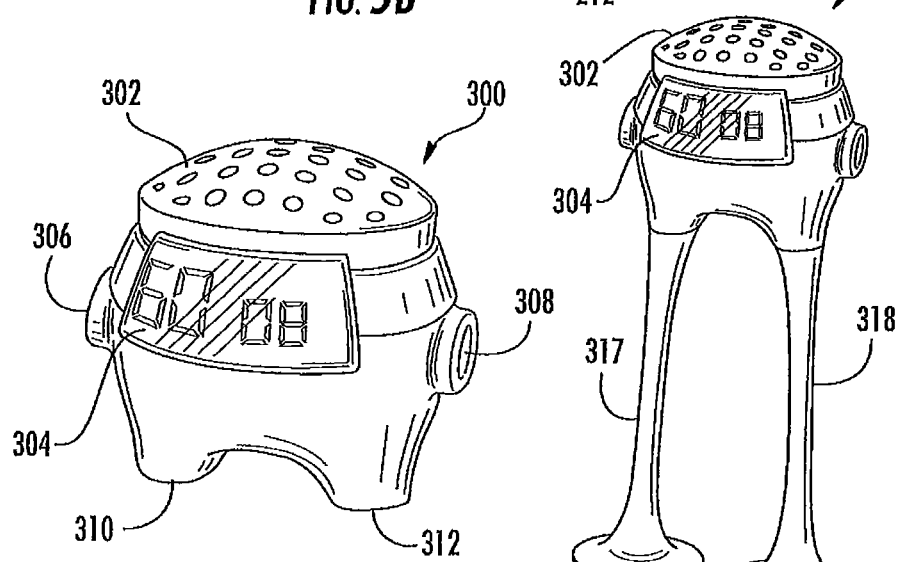
FIG. 6A illustrates yet another embodiment of the base module of the interactive educational system of the present invention.
Figure 6B:
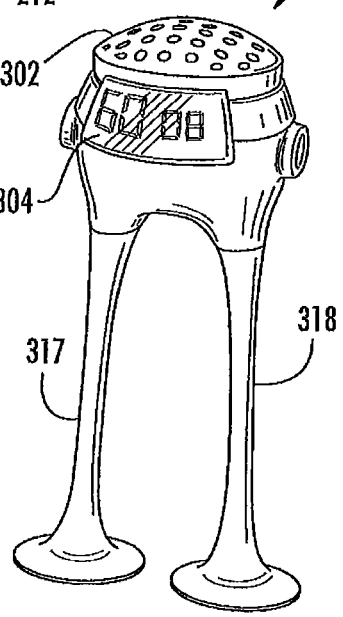
FIG. 6B illustrates the base module of FIG. 6A of the interactive educational system of the present invention having removable legs.

FIG. 6A illustrates another embodiment of a base module 300 of the interactive educational system of the present invention having a housing 302 in the shape of a funky non-sensical character. This embodiment also has sockets 306, 308 for removably attaching and maintaining arms and sockets 310, 312 for retaining a pair of legs. The base module 300 in FIG. 6A senses sound pressure levels and pitch with the sound pressure sensor 146 for viewing on display 304. In the example shown the display is reading 60 dB which indicates the level of the sound coming from the location of the sound sensor 146 housed in the base module 300. The base module 300 of FIG. 6A is shown in FIG. 6B as having removable legs 317, 318 attached to the sockets 310, 312.

Another embodiment of the base module is shown in FIGS. 7A and 7B wherein the base module 400 is shown as having a housing 402 shaped like an alien creature or light bulb. This embodiment also has sockets 406, 408 for removably attaching and maintaining arms and sockets 410, 412 for attaching and retaining a pair of legs 417, 418. The base module 400 shown in FIG. 7A includes a light sensor 148 that transmits data on light for viewing in digital display 404. In the example shown the display is reading 180 LUX which indicates that the level of light coming from the location of the base module 400 light sensor. For example, the base module 400 may be placed outside a home and thus provide a signal that the sun is up. The base module of FIG. 7A is shown in FIG. 7B as having both removable arms 414, 416 and legs 417, 418 attached to the sockets 406, 408, 410, 412, respectively.

FIG. 8 represents a variation on the embodiment of FIG. 1 of the base module of the interactive educational system of the present invention. The base module 500 has a housing 502 having sockets 506, 508 for arms and a digital display 504. In the embodiment in FIG. 8, the base module 500 is similar to that of FIG. 1 except that the housing 502 is a unitary construction in which the legs 517, 518 are built into the module as shown in FIG. 8.

Figure 9:
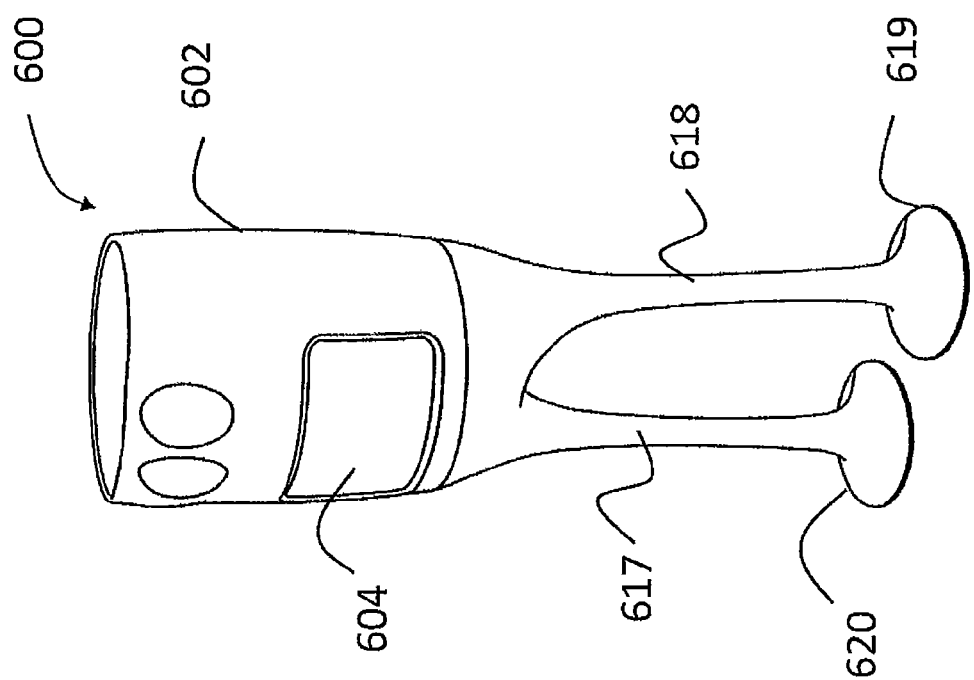
FIG. 9 illustrates yet another example of the base module with a larger graphical display, bendable legs, and a single molded leg design.

FIG. 9 represents a variation on the embodiment of FIG. 1 of the base module of the interactive education system of the present invention. The base module 600, has a housing 602 with a graphical display 604. Custom graphics, sensor data, effector states, time data, and system modes are some of the items that may be shown on the graphical display 604. The base module 600 has bendable legs 617, 618 that include a wire structure molded over by silicon to allow the legs to be formed in many shapes or wrapped around items to secure the base module 600. The feet 619, 620 are magnetic suction cups that allow the feet to be secured to each other so they can be clasped to objects like a collar, backpack, or handlebars to name a few, or surfaces that are smooth or magnetic. In the embodiment in FIG. 9, the base module 600 includes an accelerometer 147 and a light sensor 148. In the current embodiment a flashlight program was loaded wirelessly via the interactive application 700 hosted on the smart device 800 to the base module 600 wirelessly from the smart device 800. With this program, when the base module senses movement by the accelerometer (e.g., child shaking module 600) and/or the light sensor 148 housed in the base module 600 detects LUX levels below a programmed threshold, the LEDs 131 will turn ON for a predetermined time limit. The limits and effective responses can be changed by the child using the application 700.

Figure 10:
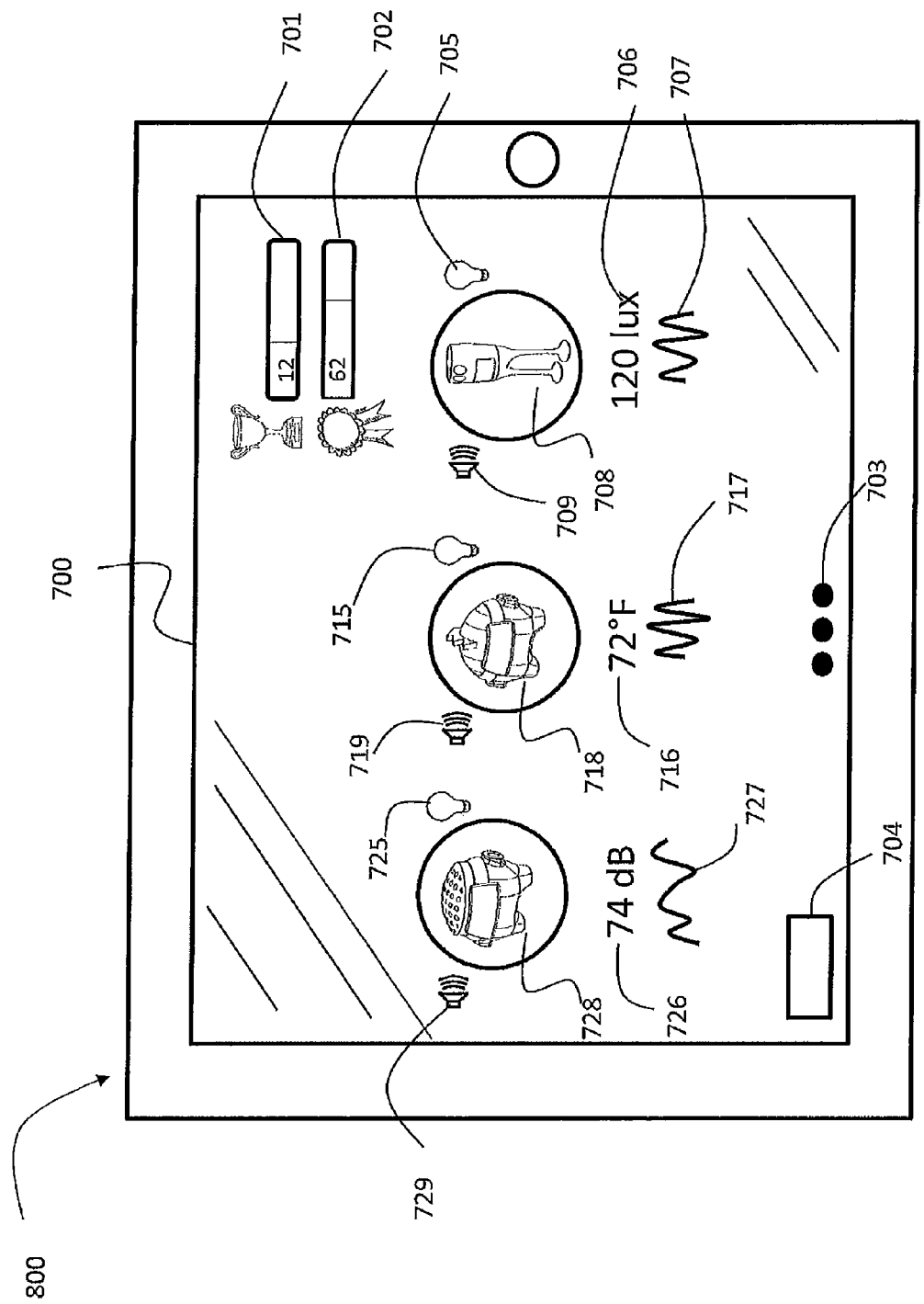
FIG. 10 illustrates the embodiment of the interactive application hosted on the smart device.

The interactive educational system of the present invention includes an application 700 hosted on a smart device 800. One embodiment of this is shown in FIG. 10. The smart device could come in many forms of devices such as a mobile device such as a cell phone, tablet, another base module 100, or a computer. The smart device 800 must include a wireless transceiver or radio 801 that can wirelessly communicate with base modules. The interactive application in this embodiment shows a general screen of the application where base modules 100, 300, and 600 are linked to the application as shown by 728, 718, 708. LED on and off commands can be sent individually to the respective base modules by clicking the light bulbs 725, 715, or 705. Similarly, commands can be sent by the smart device 800 to have a base module 100 play a tune with its buzzer 128 by clicking on 729, 719, or 709. Sensor group's 140 data transmitted from each of the base modules 100, 300, and 600 can be viewed as a graph 727, 717, 707 and the current sensor value 726, 716, 706 can be read. This embodiment of the interactive application's screen also includes a status on the level achieved 701 in the application 700. Also, a user's current progress toward achieving a merit badge 702 is reported. By completing different missions, experiments, or tasks, points are earned towards level and merit badge achievement. The button 704 can take the user back to the main screen where they can perform other functions of the application. As an example, other functions may include setting collaborative programs between the base modules 100, 300, 600 connected to the smart device 800 for the alarm or flashlight programs. The smart device 800 can communicate through the internet to store application 700 and base module 100 data in the cloud or allow for other networks of base modules to be controlled and reported on. There are many other screens and application features not shown that could be part of the interactive application 700 to accomplish the intent of this invention.

Many modifications and other embodiments of the inventions set forth herein will come to mind to one skilled in the art to which these inventions pertain having the benefit of the teachings presented in the foregoing descriptions. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An interactive educational system for teaching elementary school age children comprising:
   (a) a housing having an outer configuration that is sized and shaped to appeal to elementary school age children comprising:
      a base module comprising electronic circuitry and a sensor group including one or more sensors to receive and process scientific data, each sensor within the sensor group individually or collectively measuring a scientific principle for teaching said principle to said children;
      said electronic circuitry capable of providing power to a controller and being further operable to relay said sensor group measured scientific data to a display;
      a wireless transmitter capable of transmitting said scientific data from said base module to a smart device; and
      a wireless receiver capable of receiving commands from a smart device;
   (b) a smart device, said smart device being capable of hosting an interactive application for control and display of the data transmitted from one or more base modules, and communicating with the internet and forming a network with associated base modules to allow for collaborative control, said interactive application being operable to receive a child's input from the display to set sensor limits for one or more base modules to execute programmed responses; and
   (c) a rule-based control database, said database including limits for one or more assigned base module's scientific data in said network to initiate programmed responses on one or more assigned base module.

2. The interactive educational system according to claim 1 wherein said electronic circuitry further includes an audio response.

3. The interactive educational system according to claim 1 wherein said electronic circuitry further includes an LED response.

4. The interactive educational system according to claim 1 wherein said sensor group gathers scientific data from one or more sensors consisting of sound, temperature, light, acceleration, motion, rate, GPS, magnetic field, moisture, displacement, color, humidity, barometric pressure, force, proximity, radiation, current, voltage, biometrics, camera, and capacitive touch.

5. The interactive educational system according to claim 1 wherein said electronic circuitry includes a microcontroller unit.

6. The interactive educational system according to claim 1 wherein said sensor group includes one or more actuators consisting of linear actuators, rotary actuators, and relays.

7. The interactive educational system according to claim 1 wherein said display is an LCD display.

8. The interactive educational system according to claim 1 wherein said electronic circuitry includes a reed switch allowing a user to interact with said base module.

9. The interactive educational system according to claim 1 wherein said housing further includes sockets for removably attaching accessories to the housing.

10. The interactive educational system according to claim 1 wherein said transceiver is a Bluetooth Low Energy transceiver.

11. An interactive educational system for teaching elementary school age children comprising:
   (a) a housing having an outer configuration that is sized and shaped to appeal to elementary school age children, said housing further including sockets for removably attaching accessories to the housing;
      a base module comprising electronic circuitry and a sensor group including one or more sensors to receive and process scientific data, each sensor within the sensor group individually or collectively measuring a scientific principle for teaching said principle to said children;
      said electronic circuitry capable of providing power to a controller and being further operable to relay said sensor group measured scientific data to a display on the base module to aid in understanding the physic of a scientific principle;
      a wireless transmitter capable of transmitting said scientific data from said base module to a smart device; and
      a wireless receiver capable of receiving commands from a smart device to control said base module; and
   (b) a smart device being capable of communicating with the internet and forming a network with associated base modules to allow for collaborative control, said smart device being operable to host an interactive application for control and display of the data transmitted from one or more base modules for said children to further analyze and understand the scientific principles measured by the base modules, and experiment and demonstrate understanding of the scientific principles by setting sensor limits for one or more base modules on said smart device's interactive application for one or more base modules to execute programmed responses;

(c) a rule-based control database, said database including limits for one or more assigned base module's scientific data in said network to initiate programmed responses on one or more assigned base module; and (d) where said database is hosted locally on a base module and said base module initiates a response even when disconnected from the smart device database.

12. The interactive educational system according to claim 11 wherein said sensor group gathers scientific data from one or more sensors from the group consisting of sound, temperature, light, acceleration, motion, rate, GPS, magnetic field, moisture, distance, color, humidity, barometric pressure, force, proximity, radiation, current, biometrics, camera, voltage, displacement, and capacitive touch.

13. The interactive educational system according to claim 11 wherein said electronic circuitry includes a microcontroller unit.

14. The interactive educational system according to claim 11 wherein said housing further comprises a pair of arms removably attached to said sockets.

15. The interactive educational system according to claim 11 wherein said housing further comprises a pair of legs removably attached to said sockets.

16. The interactive educational system according to claim 1 wherein said base module does not require assembly to function.

17. The interactive educational system according to claim 11 wherein said base module does not require assembly to function.

18. An interactive educational system for teaching elementary school age children comprising:

(a) a housing having an outer configuration that is sized and shaped to appeal to elementary school age children comprising;

a base module comprising electronic circuitry and a sensor group including one or more sensors to receive and process scientific data;

each sensor within said sensor group individually or collectively measuring a scientific principle for teaching said principle to said children;

said electronic circuitry capable of providing power to a controller and being further operable to relay said sensor group measured scientific data to a display on the base module to aid in understanding the physics of a scientific principle;

a wireless transmitter capable of transmitting said scientific data from said base module to a smart device; and a wireless receiver capable of receiving commands from a smart device to control said base module; and (b) a smart device being capable of communicating with the internet and forming a network with associated base modules to allow for collaborative control;

(c) a rule-based control database, said database including limits set by the child for one or more assigned base module's scientific data in said network to experiment and demonstrate understanding of the scientific principle by initiating programmed responses on one or more assigned base module, and (d) where said database is hosted locally on a base module and said base module initiates a response or where said database is hosted on a smart device and said smart device sends out programmed responses to assigned base modules to execute programmed responses.

* * * * *